US009578493B1

(12) United States Patent
Forsblom et al.

(10) Patent No.: US 9,578,493 B1
(45) Date of Patent: Feb. 21, 2017

(54) SENSOR CONTROL SWITCH

(71) Applicant: ADTILE TECHNOLOGIES INC., San Diego, CA (US)

(72) Inventors: Nils Forsblom, San Diego, CA (US); Maximilian Metti, San Diego, CA (US); Angelo Scandaliato, San Diego, CA (US)

(73) Assignee: ADTILE TECHNOLOGIES INC., San Diego, CA (US)

( * ) Notice: Subject to any disclaimer, the term of this patent is extended or adjusted under 35 U.S.C. 154(b) by 0 days.

(21) Appl. No.: 15/145,722

(22) Filed: May 3, 2016

Related U.S. Application Data

(60) Provisional application No. 62/201,673, filed on Aug. 6, 2015.

(51) Int. Cl.
*H04W 8/24* (2009.01)
*G01D 3/10* (2006.01)
*G05B 15/02* (2006.01)
*G06F 17/18* (2006.01)

(52) U.S. Cl.
CPC ............ *H04W 8/245* (2013.01); *G01D 3/10* (2013.01); *G05B 15/02* (2013.01); *G06F 17/18* (2013.01); *H04M 2250/12* (2013.01)

(58) Field of Classification Search
USPC ......................................................... 702/189
See application file for complete search history.

(56) References Cited

U.S. PATENT DOCUMENTS

| 2007/0090180 | A1 | 4/2007 | Griffis et al. |
| 2008/0086251 | A1* | 4/2008 | Lu .................. B60T 8/1755 701/70 |
| 2009/0157341 | A1 | 6/2009 | Cheung |
| 2009/0184849 | A1 | 7/2009 | Nasiri et al. |
| 2010/0145620 | A1 | 6/2010 | Georgi et al. |
| 2011/0191024 | A1 | 8/2011 | Deluca |

(Continued)

FOREIGN PATENT DOCUMENTS

WO WO0239063 5/2002

OTHER PUBLICATIONS

International Search Report and Written Opinion for International Application No. PCT/US2016/044318, Oct. 7, 2016; 12 pages.

*Primary Examiner* — Paul D Lee
(74) *Attorney, Agent, or Firm* — Stetina Brunda Garred & Brucker

(57) ABSTRACT

A method and apparatus for governing sensor data readings from a plurality of input sensors onboard a communications device. An inventory of available input sensors is generated, and a set of requested input sensors from an application running on the communications device is received. The requested input sensors that are absent from the inventory of available input sensors is identified, and based upon received measured values from the available input sensors, equivalent values for those absent input sensors are derived. The accuracy and precision of the measured and equivalent sensor values are estimated, and those measurements not meeting certain thresholds are filtered. The measured values and the derived equivalent values meeting the predetermined thresholds for accuracy and precision, and the filtered measured values and the filtered derived equivalent values are output to the application.

20 Claims, 9 Drawing Sheets

(56) References Cited

U.S. PATENT DOCUMENTS

| | | |
|---|---|---|
| 2011/0238308 A1 | 9/2011 | Miller et al. |
| 2013/0159350 A1* | 6/2013 | Sankar .................... G06F 3/011 707/784 |
| 2013/0254141 A1* | 9/2013 | Barda ..................... A61F 13/42 706/12 |
| 2013/0296048 A1* | 11/2013 | Jeffery ................... A63F 13/12 463/31 |
| 2014/0023087 A1 | 1/2014 | Czompo |
| 2014/0107812 A1* | 4/2014 | Oguma ................... G01D 1/16 700/19 |
| 2014/0352400 A1 | 12/2014 | Barrilado et al. |

\* cited by examiner

SENSOR CONTROL SWITCH

CROSS-REFERENCE TO RELATED APPLICATIONS

This application relates to U.S. Provisional Application No. 62/201,673 filed Aug. 6, 2015 entitled "SENSOR CONTROL SWITCH," the entire disclosure of each which is hereby wholly incorporated by reference.

STATEMENT RE: FEDERALLY SPONSORED RESEARCH/DEVELOPMENT

Not Applicable

BACKGROUND

1. Technical Field

The present disclosure relates generally to mobile communications devices and human-computer interfaces therefor including integrated motion sensors, and more particularly to cross-platform motion sensor control.

2. Related Art

Mobile devices fulfill a variety of roles, from voice communications and text-based communications such as Short Message Service (SMS) and e-mail, to calendaring, task lists, and contact management, as well as typical Internet based functions such as web browsing, social networking, online shopping, and online banking. With the integration of additional hardware components, mobile devices can also be used for photography or taking snapshots, navigation with mapping and Global Positioning System (GPS), cashless payments with NFC (Near Field Communications) point-of-sale terminals, and so forth. Such devices have seen widespread adoption in part due to the convenient accessibility of these functions and more from a single portable device that can always be within the user's reach.

Although mobile devices can take on different form factors with varying dimensions, there are several commonalities between devices that share this designation. These include a general purpose data processor that executes pre-programmed instructions, along with wireless communication modules by which data is transmitted and received. The processor further cooperates with multiple input/output devices, including combination touch input display screens, audio components such as speakers, microphones, and related integrated circuits, GPS modules, and physical buttons/input modalities. More recent devices also include accelerometers, gyroscopes, and compasses that can sense motion and direction. For portability purposes, all of these components are powered by an on-board battery. In order to accommodate the low power consumption requirements, Advanced Reduced Instruction Set Computing Machine ARM architecture processors have been favored for mobile devices. Several distance and speed-dependent communication protocols may be implemented, including longer range cellular network modalities such as GSM (Global System for Mobile communications), Code Division Multiple Access (CDMA), and so forth, high speed local area networking modalities such as WiFi, and close range device-to-device data communication modalities such as Bluetooth.

Management of these hardware components is performed by a mobile operating system, also referenced in the art as a mobile platform. Currently, popular mobile platforms include Android from Google, Inc., iOS from Apple, Inc., and Windows Phone, from Microsoft, Inc. These three platforms account for over 98.6% share of the domestic U.S. market.

The mobile operating system provides several fundamental software modules and a common input/output interface that can be used by third party applications via application programming interfaces. This flexible development environment has led to an explosive growth in mobile software applications, also referred to in the art as "apps." Third party apps are typically downloaded to the target device via a dedicated app distribution system specific to the platform. Although apps are executed locally on the device, their functionality and utility may be significantly enhanced with data retrieved from remote sources. Indeed, many apps function as mobile-specific interfaces to web-based application services. Yet, notwithstanding the availability of device-native apps for the most popular web applications, users continue to rely on general-purpose web browsers installed on the mobile devices to access websites. When accessed from a mobile web browser app, alternative interfaces with larger fonts and simplified layouts that are more suitable for viewing content from the smaller display area of a mobile communications device may be presented.

User interaction with the mobile device, including the invoking of the functionality of these applications and websites, and the presentation of the results therefrom, is, for the most part, restricted to the graphical touch user interface. That is, the extent of any user interaction is limited to what can be displayed on the screen, and the inputs that can be provided to the touch interface are similarly limited to what can be detected by the touch input panel. Touch interfaces in which users press, tap, slide, flick, pinch regions of the sensor panel overlaying the displayed graphical elements with one or more fingers, particularly when coupled with corresponding animated display reactions responsive to such actions, may be more intuitive than conventional keyboard and mouse input modalities associated with personal computer systems. Thus, minimal training and instruction is required for the user to operate these devices.

However, as noted previously, mobile devices must have a small footprint for portability reasons. Depending on the manufacturer's specific configuration, the screen may be three to five inches diagonally. One of the inherent usability limitations associated with mobile devices is the reduced screen size; despite improvements in resolution allowing for smaller objects to be rendered clearly, buttons and other functional elements of the interface nevertheless occupy a large area of the screen. Accordingly, notwithstanding the enhanced interactivity possible with multi-touch input gestures, the small display area remains a significant restriction of the mobile device user interface.

Expanding beyond the confines of the touch interface, the integrated motion sensors have been utilized as an input means. Some applications such as games are suited for motion-based controls, and typically utilize roll, pitch, and yaw rotations applied to the mobile device as inputs that control an on-screen element. Along these lines, more recent remote controllers for video game console systems also have incorporated accelerometers such that motion imparted to the controller is translated to a corresponding virtual action displayed on-screen Additionally, motion sensors may be used to switch from portrait to landscape views, and vice versa, while rotating and resizing the entire viewable content.

Utilizing the accelerometer and other motion input sensors in native apps is a relatively straightforward endeavor, as the operating system/platform provides an application programming interface that generates a consistent set of data for a given motion input independent of device specifics. Further sensor data consistency can be expected in end-to-end integrated mobile platforms such as iOS, where the hardware components and the software components originate from a single source. In this regard, third party developers need only target a single hardware/software combination. Consistency in the capture and interpretation of motion sensor inputs represents a significant challenging, however, with mobile platforms such as Android where there is a wide range of hardware providers. Depending on the particular device, the quality of the sensor data may differ, which results in variable sensitivity and accuracy such that a consistent user experience in motion-based interaction becomes impossible. While targeting a fewer subset of devices available on the market may be a viable approach with native apps, this is not the case for web-based applications, as compatibility across the broadest range of devices and platforms is desirable. Optimizing the sensor data processing for each device and web browser/application configuration may be possible, but may be impractical because of the large number of combinations.

Accordingly, there is a need in the art for an improved cross-platform motion sensor control that standardizes sensor data so that web-based applications and native apps alike across a variety of devices and mobile platforms can have consistent motion input interactivity on a universal basis. There is also a need in the art for estimating sensor quality and filtering the generated sensor data to adapt to each motion input interaction.

BRIEF SUMMARY

The present disclosure is directed to a uniform interface to the motion input sensors, e.g., accelerometer, gyroscope, and magnetometer, by mobile device applications running on different hardware configurations and platforms. This may be achieved by standardizing the generated sensor data with a polyfill function for missing sensor values that are used in an interactive motion experience, along with unit conversions. Based on these operations, any motion input provided to any device will generate a consistent set of sensor reading data. Furthermore, in addition to sensor standardization, sensor quality may be estimated for accuracy and precision, and the sensor data may be filtered as necessary. The filtering procedure is understood to be adaptive to each motion-based interaction, with poor sensor readings being filtered and the filtering strategies being adjusted depending upon sensor availability.

In accordance with various embodiments of the present disclosure, there is a method for governing sensor data readings from a plurality of input sensors onboard a communications device. These sensor data readings are to be passed to an application being executed on the communications device. The method may include generating an inventory of available input sensors integrated with the communications device. There may also be a step of receiving a set of requested input sensors from the application. The method may further include identifying requested input sensors absent from the inventory of available input sensors. The method may then proceed to receiving measured values from the available input sensors, followed by a step of deriving equivalent values for the requested input sensors absent from the inventory of available input sensors based upon the received measured values from the available input sensors. There may be a further step of estimating accuracy and precision of the measured values and the derived equivalent values, then filtering the measured values and the derived equivalent values failing to meet thresholds for accuracy and precision. Thereafter, the method may include outputting the measured values and the derived equivalent values meeting the predetermined thresholds for accuracy and precision, and the filtered measured values and the filtered derived equivalent values to the application.

Another embodiment of the present disclosure is directed to a method for synthesizing reported orientation data and reported motion data from a web browser application being executed on a mobile communications device for passing to a web browser sub-application. The method may include identifying available input sensors from the reported orientation data and the reported motion data. There may also be a step of receiving from the web browser sub-application a set of requested input sensors. Then, there may be a step of flagging specific ones of the set of requested input sensors absent from the identified available input sensor, followed by a step of receiving measured values from the available input sensor. The method may further include a step of deriving equivalent values for the flagged specific ones of the requested input sensors from one or more measured values received from the available input sensors. Furthermore, the method may include normalizing each of the measured values and the derived equivalent values to respective standard units, and applying a quality evaluation to each of the measured values and the derived equivalent values. The measured values and the derived equivalent values which satisfy a standard as defined under the quality evaluation may be designated as adequate sensor values, while the measured values and the derived equivalent values not satisfying the standard as defined under the quality evaluation may be designated as inadequate sensor values. There may additionally be a step of selectively applying a processing operation to the inadequate sensor values, as well as passing the adequate sensor values and the processed inadequate sensor values to the web browser sub-application as a set of vetted sensor values.

Yet another embodiment of the present disclosure is directed to an apparatus for synthesizing reported orientation data and reported motion data from a web browser application on a mobile communications device for passing to a web browser sub-application. The apparatus may include an input interface in communication with the web browser application and receptive to the reported orientation data and the reported motion data therefrom. The reported orientation data and the reported motion data may be parsed into sets of sensor data. There may also be a sensor cataloger that identifies missing sensor data from the sets of sensor data, as well as a polyfill engine that derives equivalent values for the missing sensor data from the sets of sensor data. The polyfill engine may be receptive to identifications of the missing sensor data from the sensor cataloger. The apparatus may also include a sensor data evaluator that estimates accuracy and precision of the sets of sensor data and the derived equivalent values for the missing sensor data. The sets of sensor data and the derived equivalent values for the missing sensor data may be classified as adequate or inadequate in accordance with evaluations thereof against a standard by the sensor data evaluator. There may also be a filtering engine that filters the sets of sensor data and the derived equivalent values for the missing sensor data classified as inadequate. Additionally, the apparatus may include an output interface to the web browser sub-application that is in communication with the sensor data evaluator and the filtering engine. The sets of sensor data and the derived equivalent values for the missing sensor data classified as adequate, and the sets of sensor data and the derived equivalent values for the missing sensor data filtered by the filtering engine may be output by the output interface as vetted sensor data.

Certain other embodiments of the present disclosure contemplate respective computer-readable program storage media that each tangibly embodies one or more programs of instructions executable by a data processing device to perform the foregoing methods. The present disclosure will be best understood accompanying by reference to the following detailed description when read in conjunction with the drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of methods and apparatuses for cross-platform motion sensor control. The detailed description set forth below in connection with the appended drawings is intended as a description of the several presently contemplated embodiments of these methods and apparatuses, and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
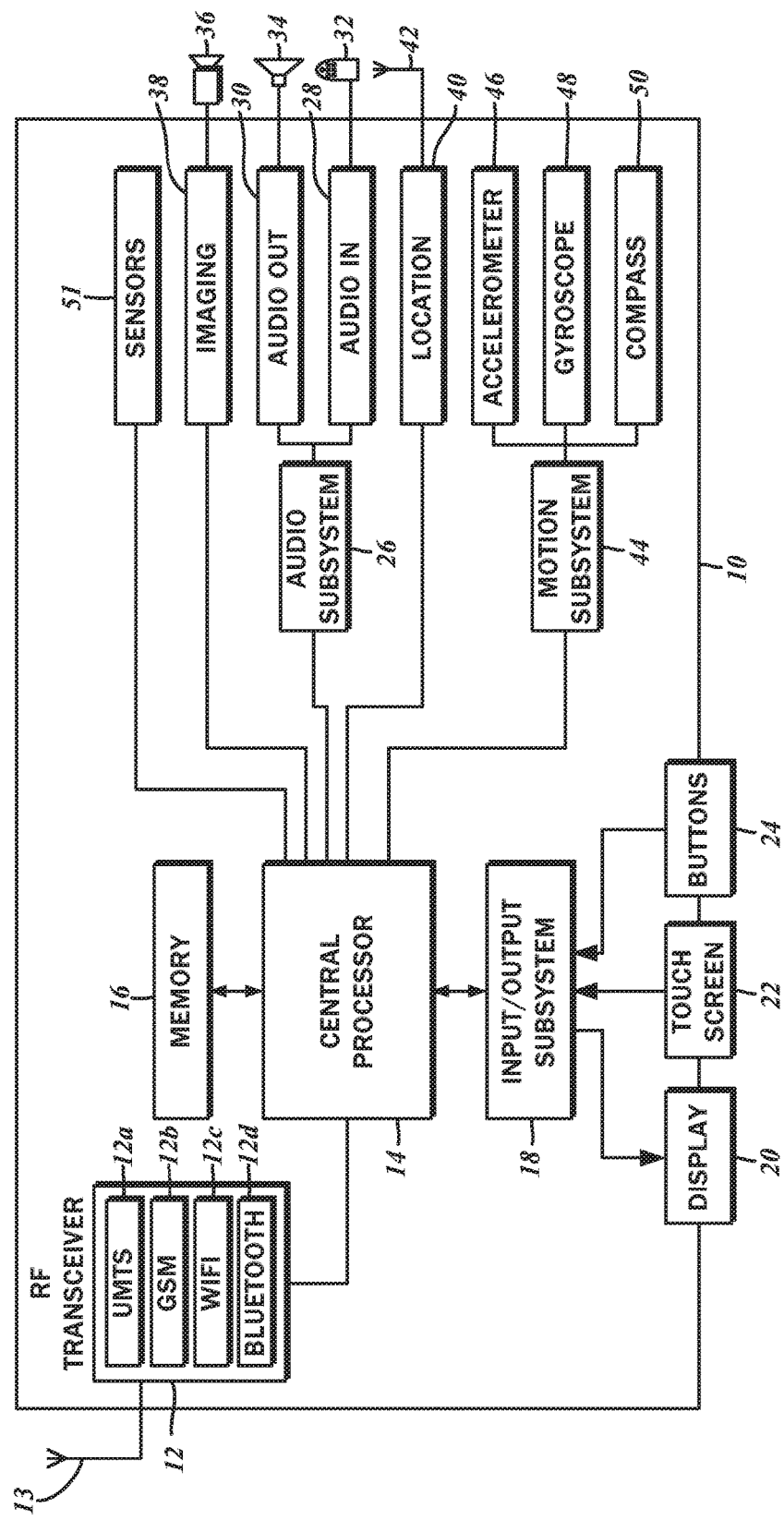
FIG. 1 is a block diagram illustrating the various hardware components of an exemplary mobile communications device that may be utilized in connection with the embodiments of the present disclosure.

FIG. 1 illustrates one exemplary mobile communications device 10 on which various embodiments of the present disclosure may be implemented. The mobile communications device 10 may be a smartphone, and therefore include a radio frequency (RF) transceiver 12 that transmits and receives signals via an antenna 13. Conventional devices are capable of handling multiple wireless communications modes simultaneously. These include several digital phone modalities such as UMTS (Universal Mobile Telecommunications System), 4G LTE (Long Term Evolution), and the like. For example, the RF transceiver 12 includes a UMTS module 12a. To the extent that coverage of such more advanced services may be limited, it may be possible to drop down to a different but related modality such as EDGE (Enhanced Data rates for GSM Evolution) or GSM (Global System for Mobile communications), with specific modules therefor also being incorporated in the RF transceiver 12, for example, GSM module 12b. Aside from multiple digital phone technologies, the RF transceiver 12 may implement other wireless communications modalities such as WiFi for local area networking and accessing the Internet by way of local area networks, and Bluetooth for linking peripheral devices such as headsets. Accordingly, the RF transceiver may include a WiFi module 12c and a Bluetooth module 12d. The enumeration of various wireless networking modules is not intended to be limiting, and others may be included without departing from the scope of the present disclosure.

The mobile communications device 10 is understood to implement a wide range of functionality through different software applications, which are colloquially known as "apps" in the mobile device context. The software applications are comprised of pre-programmed instructions that are executed by a central processor 1 and that may be stored on a memory 16. The results of these executed instructions may be output for viewing by a user, and the sequence/parameters of those instructions may be modified via inputs from the user. To this end, the central processor 14 interfaces with an input/output subsystem 18 that manages the output functionality of a display 20 and the input functionality of a touch screen 22 and one or more buttons 24.

In a conventional smartphone device, the user primarily interacts with a graphical user interface that is generated on the display 20 and includes various user interface elements that can be activated based on haptic inputs received on the touch screen 22 at positions corresponding to the underlying displayed interface element. One of the buttons 24 may serve a general purpose escape function, while another may serve to power up or power down the mobile communications device 10. Additionally, there may be other buttons and switches for controlling volume, limiting haptic entry, and so forth. Those having ordinary skill in the art will recognize other possible input/output devices that could be integrated into the mobile communications device 10, and the purposes such devices would serve. Other smartphone devices may include keyboards (not shown) and other mechanical input devices.

The mobile communications device 10 includes several other peripheral devices. One of the more basic is an audio subsystem 26 with an audio input 28 and an audio output 30 that allows the user to conduct voice telephone calls. The audio input 28 is connected to a microphone 32 that converts sound to electrical signals, and may include amplifier and ADC (analog to digital converter) circuitry that transforms the continuous analog electrical signals to digital data. Furthermore, the audio output 30 is connected to a loudspeaker 34 that converts electrical signals to air pressure waves that result in sound, and may likewise include amplifier and DAC (digital to analog converter) circuitry that transforms the digital sound data to a continuous analog electrical signal that drives the loudspeaker 34. Furthermore, it is possible to capture still images and video via a camera 36 that is managed by an imaging module 38.

Due to its inherent mobility, users can access information and interact with the mobile communications device 10 practically anywhere. Additional context in this regard is discernible from inputs pertaining to location, movement, and physical and geographical orientation, which further enhance the user experience. Accordingly, the mobile communications device 10 includes a location module 40, which may be a Global Positioning System (GPS) receiver that is connected to a separate antenna 42 and generates coordinates data of the current location as extrapolated from signals received from the network of GPS satellites. Motions imparted upon the mobile communications device 10, as well as the physical and geographical orientation of the same, may be captured as data with a motion subsystem 44, in particular, with an accelerometer 46, a gyroscope 48, and a compass 50, respectively. Although in some embodiments the accelerometer 46, the gyroscope 48, and the compass 50 directly communicate with the central processor 14, more recent variations of the mobile communications device 10 utilize the motion subsystem 44 that is embodied as a separate co-processor to which the acceleration and orientation processing is offloaded for greater efficiency and reduced electrical power consumption. One exemplary embodiment of the mobile communications device 10 is the Apple iPhone with the M7 motion co-processor. It is to be understood that not all mobile communications devices 10 include all of the accelerometer 46, the gyroscope 48, and the compass 50. According to various embodiments of the present disclosure, however, inputs may be inferred from combining measurements of the available sensors.

The components of the motion subsystem 44, including the accelerometer 46, the gyroscope 48, and the compass 50, while shown as integrated into the mobile communications device 10, may be incorporated into a separate, external device. This external device may be wearable by the user and communicatively linked to the mobile communications device 10 over the aforementioned data link modalities. The same physical interactions contemplated with the mobile communications device 10 to invoke various functions as discussed in further detail below may be possible with such external wearable device.

There are other sensors 51 that can be utilized in the mobile communications device 10 for different purposes. For example, one of the other sensors 51 may be a proximity sensor to detect the presence or absence of the user to invoke certain functions, while another may be a light sensor that adjusts the brightness of the display 20 according to ambient light conditions. Those having ordinary skill in the art will recognize that other sensors 51 beyond those considered herein are also possible.

The present disclosure is directed to various methods and apparatuses for providing a uniform interface to the sensors of the mobile communications device 10, particularly those for capturing motion input. As explained above, although many mobile communications devices 10 include each of the accelerometer 46, the gyroscope 48, and the compass 50, this is not universal. Furthermore, because of varying quality in the sensors, the accuracy and precision of the sensor readings may likewise vary from one device to another. An important objective of a content producer, especially when delivering content via the Internet, is consistency of the user experience when interacting therewith. This objective is challenging when sensor quality is variable across the wide range of devices currently in use, and so the various embodiments of the present disclosure contemplate a uniform interface to these sensors.

The exemplary embodiments will be described in the context of an interactive experience that is presented via a web browser application running on the mobile communications device 10. This interactive experience is disclosed in co-pending and co-owned U.S. patent application Ser. No. 14/160,257 filed Jan. 21, 2014 and entitled "Motion and Gesture-Based Advertising Activation," the entirety of the disclosure of which is hereby incorporated by reference. However, it will be appreciated by those having ordinary skill in the art that the same apparatuses and methods may be utilized in connection with a native app, or any other environment. With reference to the flowchart of FIG. 2, this interactive experience may begin with a step 200 of displaying content on a graphical user interface being rendered on the display 20 of the mobile communications device 10. More particularly, the graphical user interface is that of a web browser application, with the content being retrieved from a website. The content may include conventionally activatable user interface elements such as a button, a hyperlink. In accordance with a step 210, a first external input that triggers such activatable user interface element is received. The external input can be a tap on the touch screen 22. In response to this input, the next part of the user experience is initiated, where the user interacts with the displayed content by providing various motions to the mobile communications device 10. Before this interaction begins, the sensor data is standardized and filtered in accordance with the various embodiments of the various disclosure, including a step 220 of detecting missing sensor values and imputing the data for those otherwise missing sensors, and a step 230 of evaluating sensor data for activating adaptive filters. These two steps will be described in further detail below.

Once the aforementioned steps of standardizing the sensor readings and filtering the incoming data therefor, the user interaction experience continues with a step 240 of displaying user experience invocation instructions. The initial orientation of the mobile communications device 10 is then calibrated in accordance with a step 250. The procedure therefor is described in further detail in co-pending and co-owned U.S. patent application Ser. No. 14/802,649 filed Jul. 17, 2014 and entitled "Physical Orientation Calibration for Motion and Gesture-Based Mobile Advertising Activation Sequence," the entirety of the disclosure of which is hereby incorporated by reference.

After calibration of the initial orientation, the external input in the form of motion applied to the mobile communications device 10 and sensed by the onboard sensors is received per step 260. Based upon the standardization and filtration factors determined at the outset of the interactivity sequence, e.g., steps 220 and 230, the received sensor input is translated into quantified values according to step 270. The translated values are then processed and a response is generated. Specifically, in a step 280, the user experience is generated when there is a match between the translated quantified values and predefined values that correspond to the experience invocation instructions.

Figure 3:
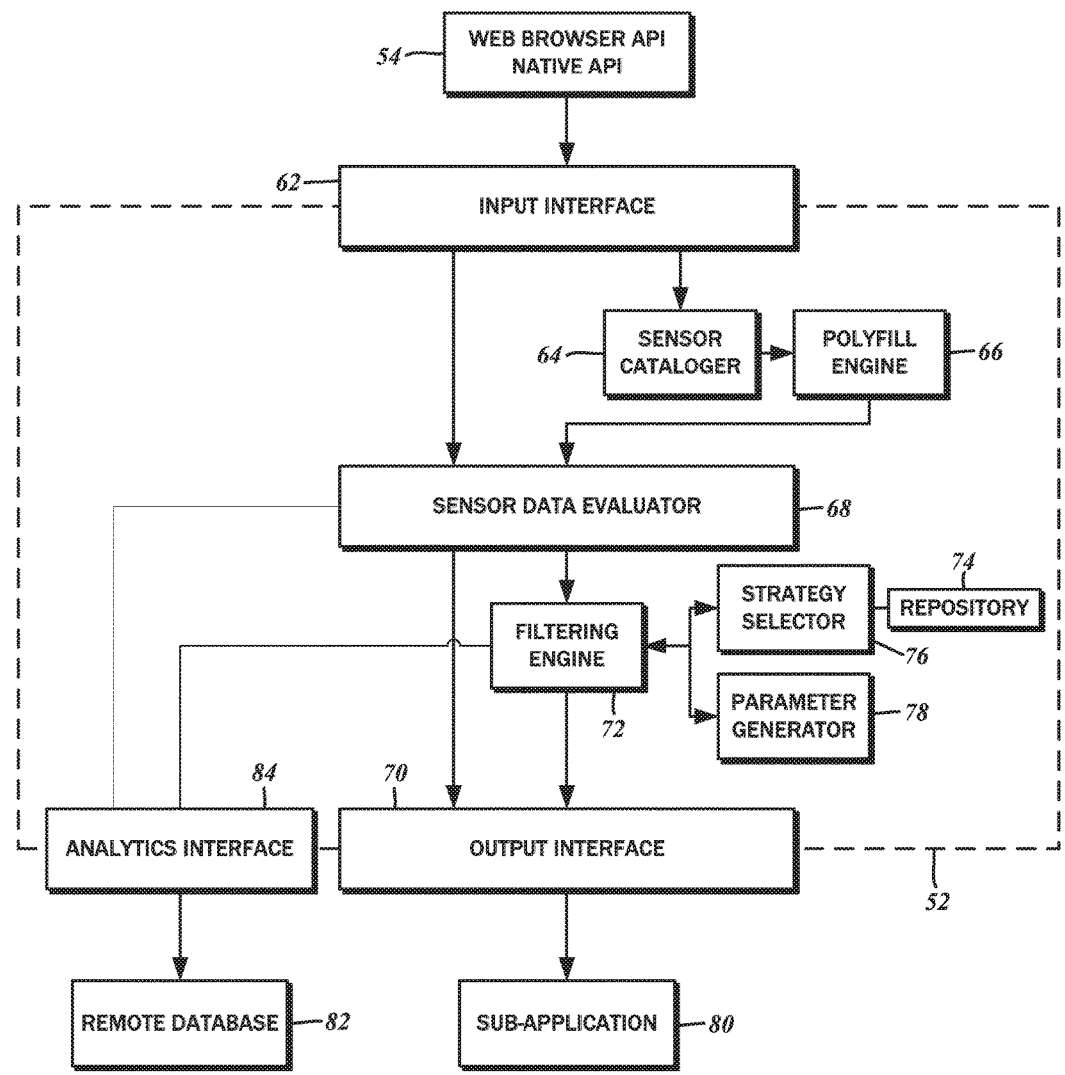
FIG. 3 is a block diagram illustrating an embodiment of an apparatus for synthesizing reported orientation data and reported motion data from a web browser application, including its constituent components.
Figure 4:
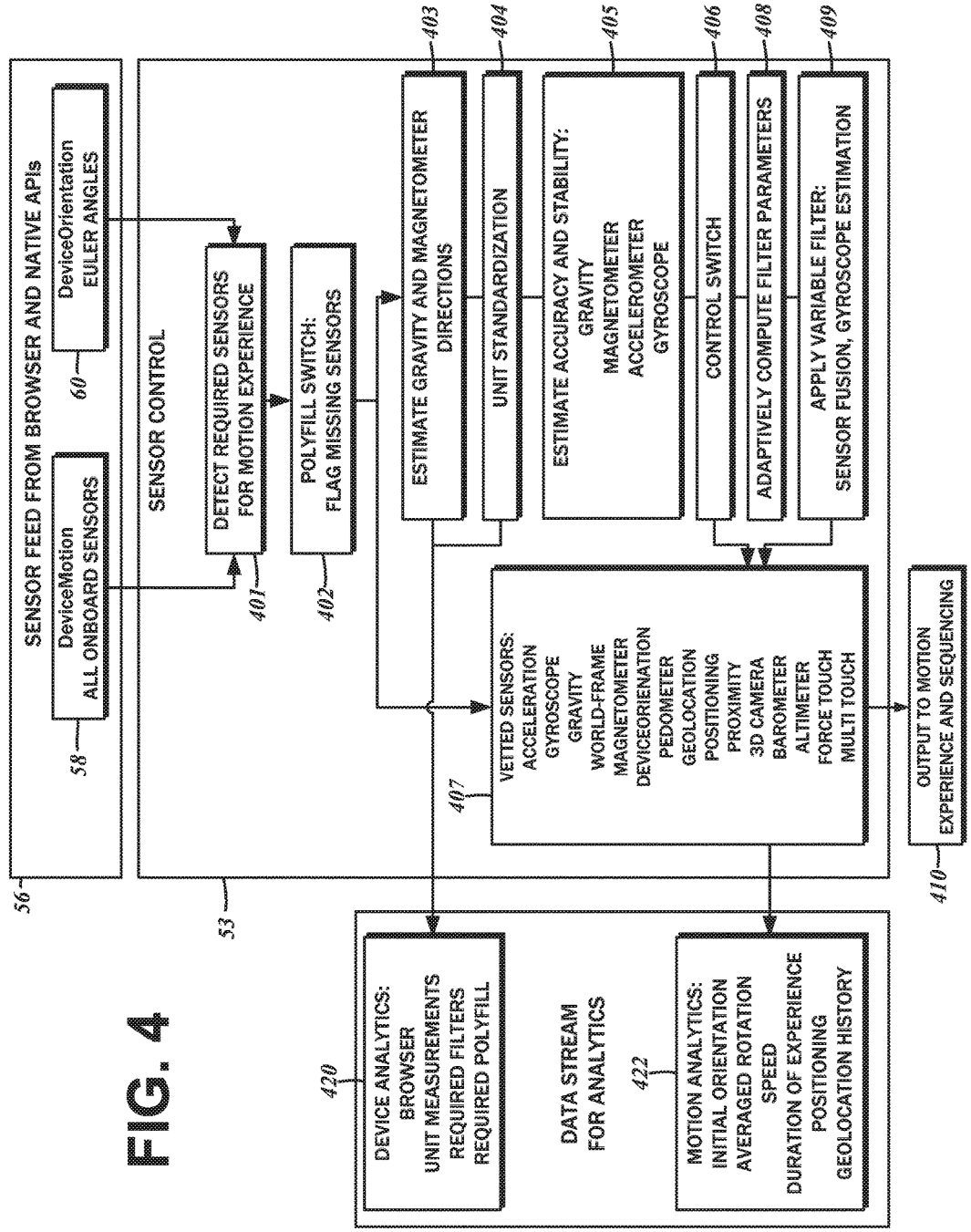
FIG. 4 is a block flow diagram showing the processing steps of the reported orientation data and reported motion data in a sensor control system.

Referring now to the block diagram of FIG. 3, a sensor control switch system 52 or apparatus is comprised of various functional/logical blocks, with each block corresponding to a specific function. The logical segregation of these blocks, however, are by way of example only and not of limitation, and any suitable configuration or organization may be readily substituted. FIG. 4 is of a more particularized embodiment of the sensor control switch system 53 for synthesizing the reported orientation data and reported motion data from a web browser application running on the mobile communications device 10, and is illustrated as a series of interconnected data processing sequences. Embodiments directed to a corresponding method along these lines is also contemplated in accordance with the present disclosure, and will be described with reference to the flowchart of FIG. 5.

As shown in FIG. 3, the sensor control switch system 52 is linked to a web browser application programming interface (API) 54, which reports the orientation and the motion imparted to the mobile communications device 10. It is possible for mobile device platform native APIs to provide the same interface, and the present disclosure is not limited to a browser-based implementation. The web browser API 54 generates a data feed 56 that can be accessed by calling the DeviceMotion object 58 and a DeviceOrientation object 60. It will be recognized that the DeviceMotion object 58 and the DeviceOrientation object 60 are specified by conventional web browser standards, and the data provided through these objects originate from disjoint sensor readings. In some embodiments, the DeviceOrientation may be derived from sensor fusion of all, or in part of, the accelerometer 46, the gyroscope 48, and the compass 50, depending upon their inclusion in the mobile communications device 10. The DeviceOrientation object 60 is understood to provide an estimate of the orientation as measured in Euler angles, that is, yaw, pitch, and roll, and is derived from several stock hardware sensors of the mobile communications device 10. However, it will also be appreciated that the orientation may be given in quaternion representations, rotation matrix representations, and so forth. The DeviceMotion object 58 is understood to be an interface to a set of raw and derived sensor measurements, including raw accelerometer measurements and a time interval corresponding to the frequency of the sensor measurements. If the sensor hardware is available, the DeviceMotion object 58 include the gyroscope 48 readings, as well as gravity-corrected accelerometer readings that can isolate user-induced motion on the mobile communications device 10. As indicated above, the mobile communications device 10 may include additional sensing devices such as those that are part of the location module 40, the imaging module 38, and the audio input 28. Similar browser API objects like the DeviceMotion object 58 and the DeviceOrientation object 60 may exist for these additional sensors, where a call to the corresponding object from the web browser application is operative to produce the data from the sensors.

Typically, the readings from the sensors are unsatisfactory with respect to accuracy and precision, and results in poor interactions with motion-driven user experiences. As will be described in further detail below, improvements in accuracy with respect to device orientation are contemplated. Specifically, the orientation may be determined by expressing the direction of gravity and magnetic north relative to the mobile communications device, which are estimated using the accelerometer 46, compass 50/magnetometer, and the gyroscope 48 to the extent available. Filtering the dynamics of gravity and magnetic north directions is understood to improve the readings from the DeviceOrientation object 60. The dynamics of these directions are described by angular velocities of the mobile communications device 10, which are directly related to the values reported by the gyroscope 48. Based upon this relationship, the present disclosure contemplates the estimation of most device sensors from raw motion sensor readings and filtered orientation measurements. Only those sensor readings that are not provided via the data feed 56 from the web browser API 54 are derived to improve efficiency, and only those sensor readings that are determined to be poor are subject to a filtering process.

Referring to FIG. 3, the sensor control switch system 52 includes an input interface 62 that is in communication with a web browser application over the aforementioned web browser API 54. As indicated above, the web browser API 54 provides reported orientation data and reported orientation data, and the input interface 62 is receptive thereto. These collections of data from, e.g., the DeviceMotion object 58 and the DeviceOrientation object 60, are understood to be parsed into sets of sensor data.

As shown in the block flow diagram of FIG. 4, the first stage or procedure 401 of the sensor control switch system 53 involves a detection of which sensors are needed for the motion-based user interface experience being presented to the user of the mobile communications device 10. In the method for synthesizing the reported orientation data and reported motion data from the web browser application, this corresponds to a step 501 of identifying available input sensors from the reported orientation data and the reported motion data. This method contemplates passing the synthesized orientation data and motion data to a web-browser sub application e.g., the motion-driven user experience being executed within the browser application, and so there is also a step 502 of receiving a set of requested input sensors therefrom. The first stage or procedure 401 shown in the block flow diagram of FIG. 4 also encompasses a step 503 of flagging specific ones of the set of requested input sensors that are absent from the identified available input sensors. In the sensor control switch system 52 shown in FIG. 3, these three steps may be performed by a sensor cataloger 64.

Once the missing sensor readings are identified, a polyfill engine 66 generates equivalent values for the missing sensors based upon actual measured values from other sensors. This is understood to involve an initial step 510 of receiving the measured values from the available sensors, followed by a step 511 of deriving equivalent values for the flagged specific ones of the requested input sensors from one or more measured values received from the available input sensors. In this regard, the polyfill engine 66 is receptive to identifications of the missing sensor data from the sensor cataloger 64, as well as the received measured values from the available input sensors. This process corresponds to a second stage or procedure 402 in the block flow diagram of FIG. 4.

Continuing with this embodiment, in a third stage or procedure 403, gravity and magnetometer (compass) directions are estimated. According to one implementation, the estimates are derived by calculating a normalized gravity vector based upon trigonometric identities on pitch, roll, and yaw, as well as a dip-corrected magnetometer vector. This is followed by a fourth stage or procedure 404 of unit standardization, which is understood to correspond to a step 515 of normalizing each of the measured values and the derived equivalent values to respective standard units. Thus, uniformity across different devices and web browser applications can be maintained. By way of example, accelerometer data is normalized to meters per second squared, gyroscope data is normalized to radians per second, and orientation is normalized to standard Euler angles. The intervals of the various sensor data, whether measured or derived, are defined in terms of seconds.

The normalized sensor data, e.g., gravity, magnetometer, accelerometer, and gyroscope, is then evaluated for precision and accuracy in a fifth stage or procedure 405. Prior to this evaluation, a bias correction operation of the sensor data, as well as a correction for Coriolis force, may also be performed. This step may take place at any time around the normalization procedure, so the order is presented by way of example only and not of limitation. In the embodiment of the sensor control switch system 52 shown in FIG. 3, this evaluation is handled by a sensor data evaluator 68. The evaluation is based on both qualitative and quantitative characteristics, including smoothness, monotonicity, and uncertainty. If in a sixth stage or procedure 406, e.g., the control switch determines which sensor data is satisfactory, and which sensor data requires further filtering. In other words, the sets of sensor data and the derived equivalent values for the missing data are classified as adequate or inadequate in accordance with evaluations against a standard. This standard may be predetermined, that is, static and preset, or generated dynamically based on other available data, including variations in measured values and the derived equivalent values over a given duration. The aforementioned procedure of determining adequate versus inadequate sensor data corresponds to a step 520 of applying a quality evaluation to each of the measured values and the derived equivalent values.

The sensor data that has been evaluated to be adequate or satisfactory is then passed to an output interface 70 in the sensor control switch system 52 shown in FIG. 3. Alternatively, in the sensor control switch system 53 shown in FIG. 4, the adequate sensor data may be referred to as vetted sensor data, per block 407.

The inadequate sensor data, on the other hand, undergoes a filtering procedure to improve quality. In the sensor control switch system 52 of FIG. 3, there is a filtering engine 72 that filters the sets of the sensor data and the derived equivalent values for the missing sensor data. According to one embodiment of the present disclosure, this involves a multistage process. First, the filter strategy is selected based upon the identity of the sensor from which the data is to be filtered, and which other sensors are present on the mobile communications device 10. In one implementation, the filter strategy is selected from one of several predetermined filter strategies that may be stored in, for example, a repository 74. The selection may be made by a strategy selector 76. By way of example, if the device orientation is to be filtered and the readings from the gyroscope 48 are available, then a sensor fusion filter is selected. If estimates of rotation were derived and the gyroscope 48 is unavailable, then the derived rotation is filtered. The specific parameters of the filtering operation, that is, the aggressiveness/strength of the filters are selected by a parameter generator 78. Specifically, the parameter generator derives one or more of the filtering parameters based upon an evaluation of the sets of sensor data and the derived equivalent values for the missing sensor data. Referring to the block flow diagram of FIG. 4, the foregoing corresponds an eighth process or procedure 408 of adaptively computing filtering parameters, and a ninth process or procedure 409 of applying the variable filter using the generated parameters to the inadequate sensor data.

Figure 5:
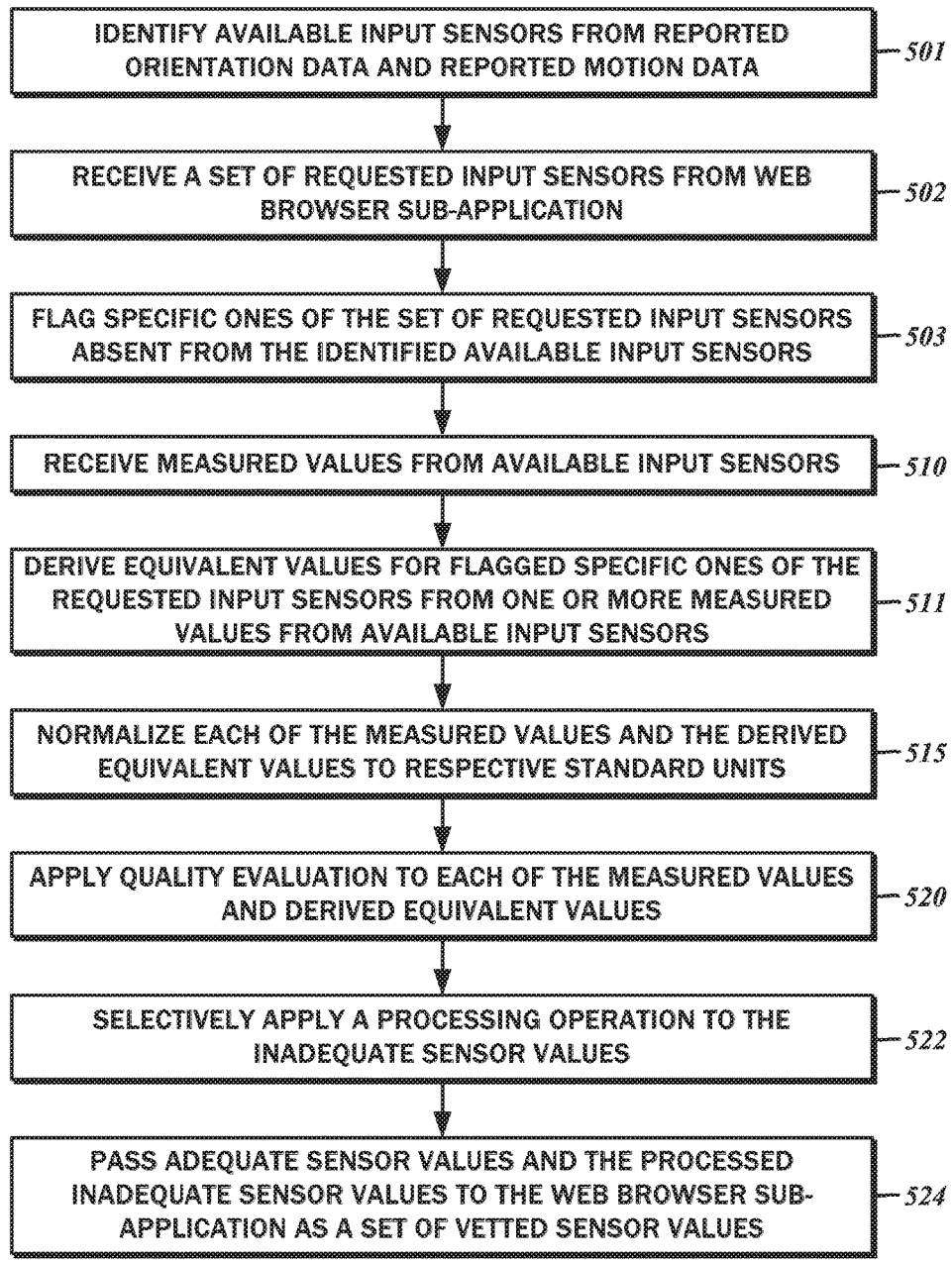
FIG. 5 is a flowchart of a sequence of steps in a method for synthesizing reported orientation data and reported motion data from a web browser application.

The aforementioned filtering procedure is understood to generally correspond to a step 522 of selectively applying a processing operation to the inadequate sensor values in the method depicted in the flowchart of FIG. 5. Continuing with this method, there is also a step 524 of passing the filtered inadequate sensor values to the output interface 70, which is in communication with a web browser sub-application 80, as well as the adequate sensor values as previously determined by the sensor data evaluator 68 or the control switch 406. Thus, the filtered inadequate sensor values are also referred to as vetted sensor data, per block 407. The aforementioned procedure of passing the filtered inadequate sensor data and the adequate sensor data is also referred to in the block flow diagram of FIG. 4 as a tenth process or procedure 410 of outputting the sensor data to the motion experience and sequencing.

Optionally, various statistical data pertaining to the operation of the sensor control switch system 52 may be transmitted to a remote database 82 via an analytics interface 84. This information may be accompanied by an identifier of the particular mobile communications device 10 to which it pertains. With additional reference to FIG. 4, amongst the operating statistics data that is captured, particularly following the unit standardization process or procedure 404 and the accuracy and stability process or procedure 405, include the identity of the web browser application, the required polyfill functions, and the required filters. This may be provided in a first data stream 420, and generally referred to as device analytics. Operating statistics data generated once all of the measured and derived sensor data has been vetted as in block 407, the initial orientation, the average rotation speed, the duration of the interactive motion-driven user experience, positioning, geolocation history, and so forth. This data may be provided in a second data stream 422, and generally referred to as motion analytics. This data may be utilized later to improve the operation of the sensor control switch systems 52, 53, as well as the motion-driven user experience.

Figure 2:
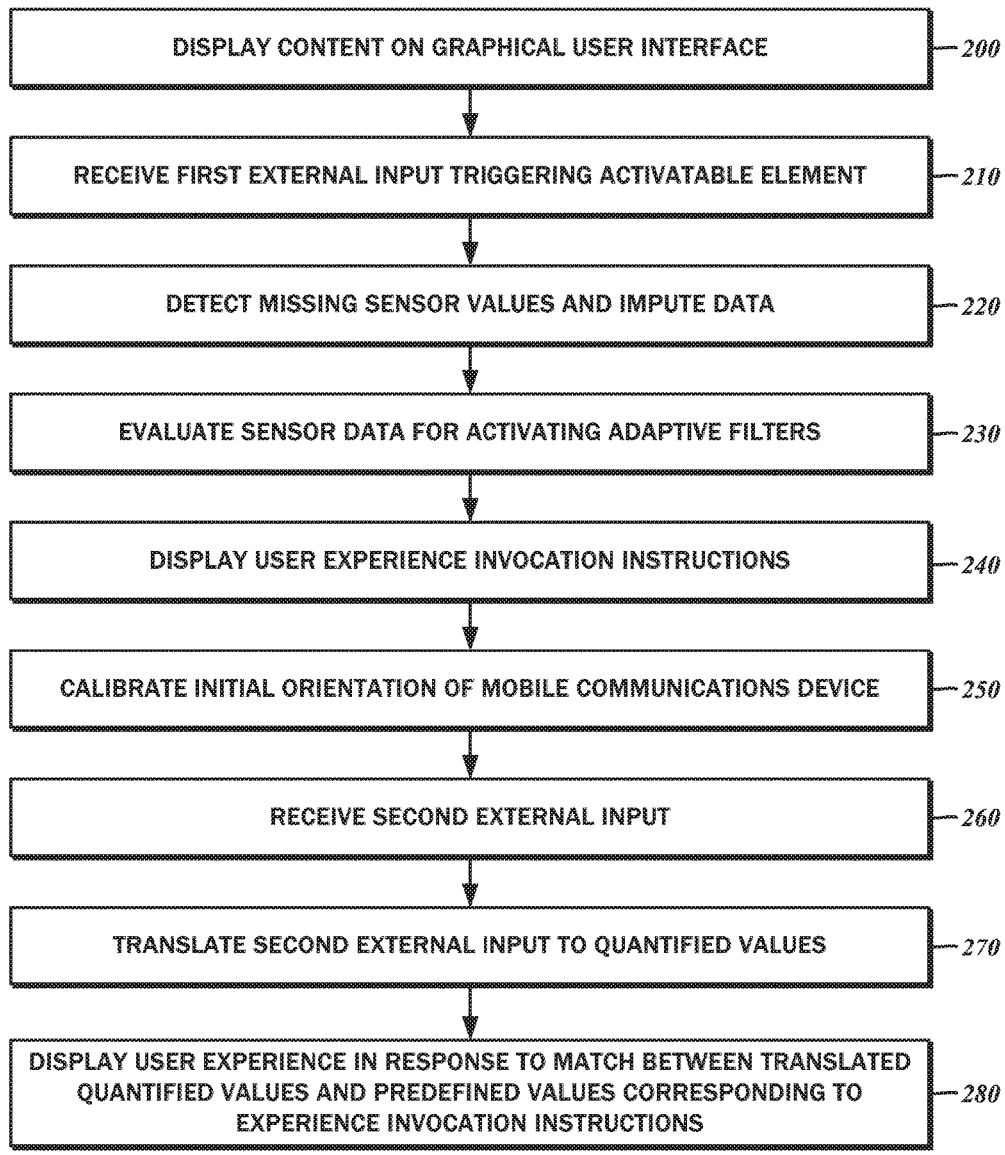
FIG. 2 is a flowchart depicting one example user interaction sequence in which the embodiments of the presently disclosed method for governing sensor data readings may be utilized.

Referring now the flowcharts of FIGS. 6-9, the procedure of synthesizing reported orientation data and reported motion data described above will be explained in the context of the overall interactive experience as generally set forth above with reference to the flowchart of FIG. 2. Additionally, however, the following explanation will include specific steps/sequences pertaining to known mobile communications device 10/web browser application combinations.

Figure 6:
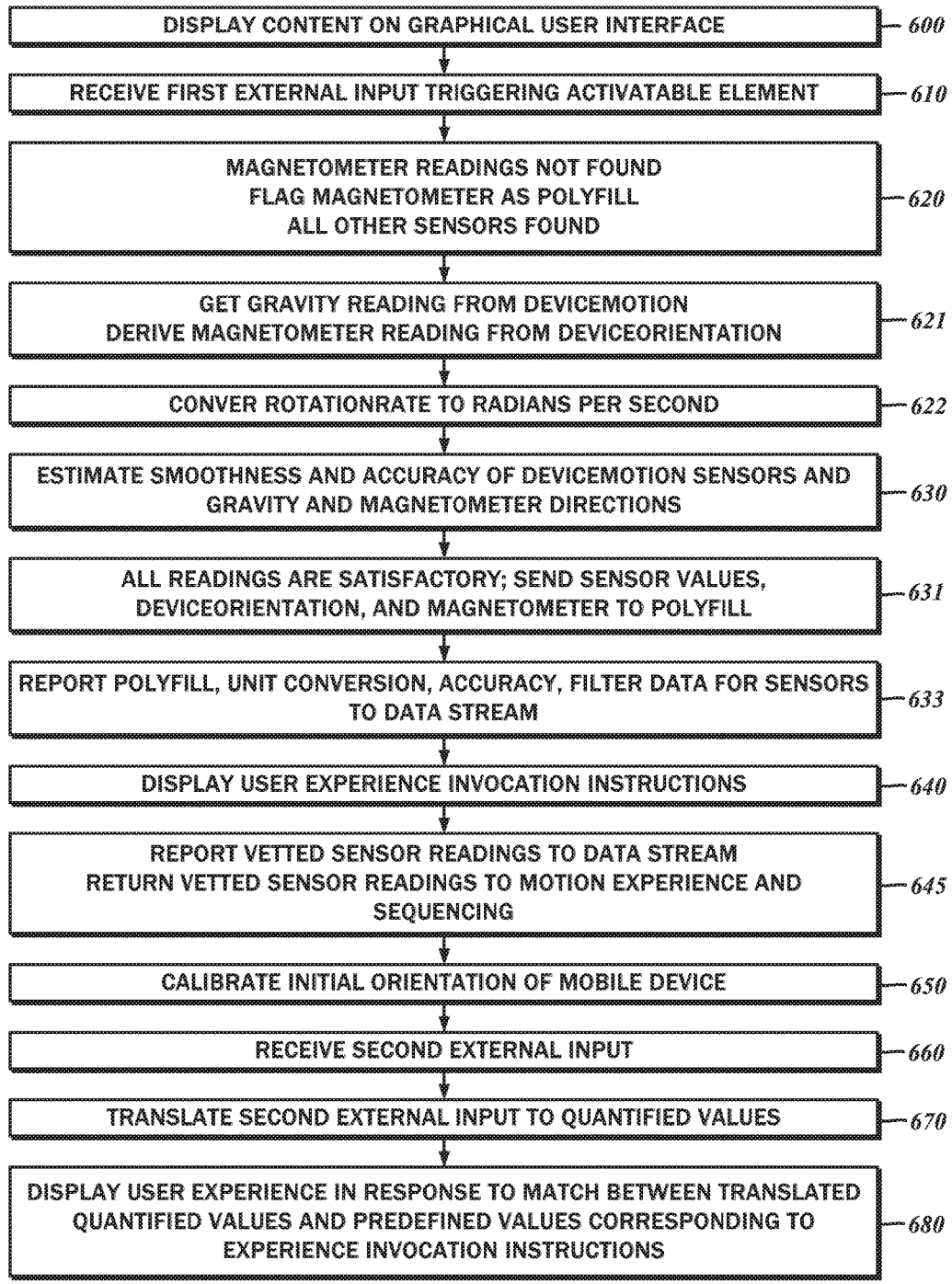
FIG. 6 is a flowchart of the sequence of operations performed by a first web browser application running on a first mobile platform in cooperation with the sensor control system of the present disclosure to synthesize reported orientation data and reported motion data.

FIG. 6 is directed to a method that is specific to a first device and web browser combination, which may be the Apple iPhone and the Safari web browser. The interactive experience begins with a step 600 of displaying content on a graphical user interface rendered on the display 20 of the mobile communications device 10. This is understood to correspond to the step 200 described above. Then, in accordance with a step 610, a first external input that triggers such activatable user interface element is received.

In step 620, as particular to the device/browser combination, magnetometer readings are not found, and so the magnetometer is flagged for the polyfill function. However, all other sensors would be found. Thereafter, per step 621, the gravity readings are obtained from the DeviceMotion object 58, and the magnetometer reading is derived from the DeviceOrientation object 60. In a step 622, the rotation rate is converted to a standard unit of radians per second. The steps 620, 621, and 622 are understood to correspond to the more generally recited step 220 of detecting missing sensor values and imputing data.

In a step 630, the smoothness and accuracy of the sensor values reported through the DeviceMotion object 58, and the gravity and magnetometer directions as derived are evaluated. Typically, this evaluation on the data reported from/derived by aforementioned iPhone/Safari browser combination meets the set standards, and no further filtering is necessary. Thus, according to a step 631, all of the readings are evaluated as satisfactory, and the sensor values and the data in the DeviceOrientation object 60 are sent to the polyfill function to generate the magnetometer direction. The aforementioned steps 630 and 631 are understood to correspond to the more generally recited step 230 of evaluating sensor data for activating adaptive filters.

As indicated above, various operating statistics may be reported to the remote database 82. Specifically, in a step 633, the sensor data, and the derived polyfill data are reported. Furthermore, in a step 645, vetted sensor readings are reported to the remote database 82.

The user interaction experience continues with a step 640 of displaying user experience invocation instructions, which corresponds to step 240. Along these lines, in a step 650 (similar to step 250), the initial orientation of the mobile communications device 10 is calibrated. Before this step, however, there The external input in the form of motion applied to the mobile communications device 10 and sensed by the onboard sensors is received per step 660 (similar to step 260). Based upon the standardization and filtration factors determined at the outset of the interactivity sequence, e.g., steps 620-622 and 630-632, the received sensor input is translated into quantified values according to step 670 (similar to step 270). The translated values are then processed and a response is generated in a step 680 (similar to step 280), where the user experience is generated when there is a match between the translated quantified values and predefined values that correspond to the experience invocation instructions.

Figure 7:
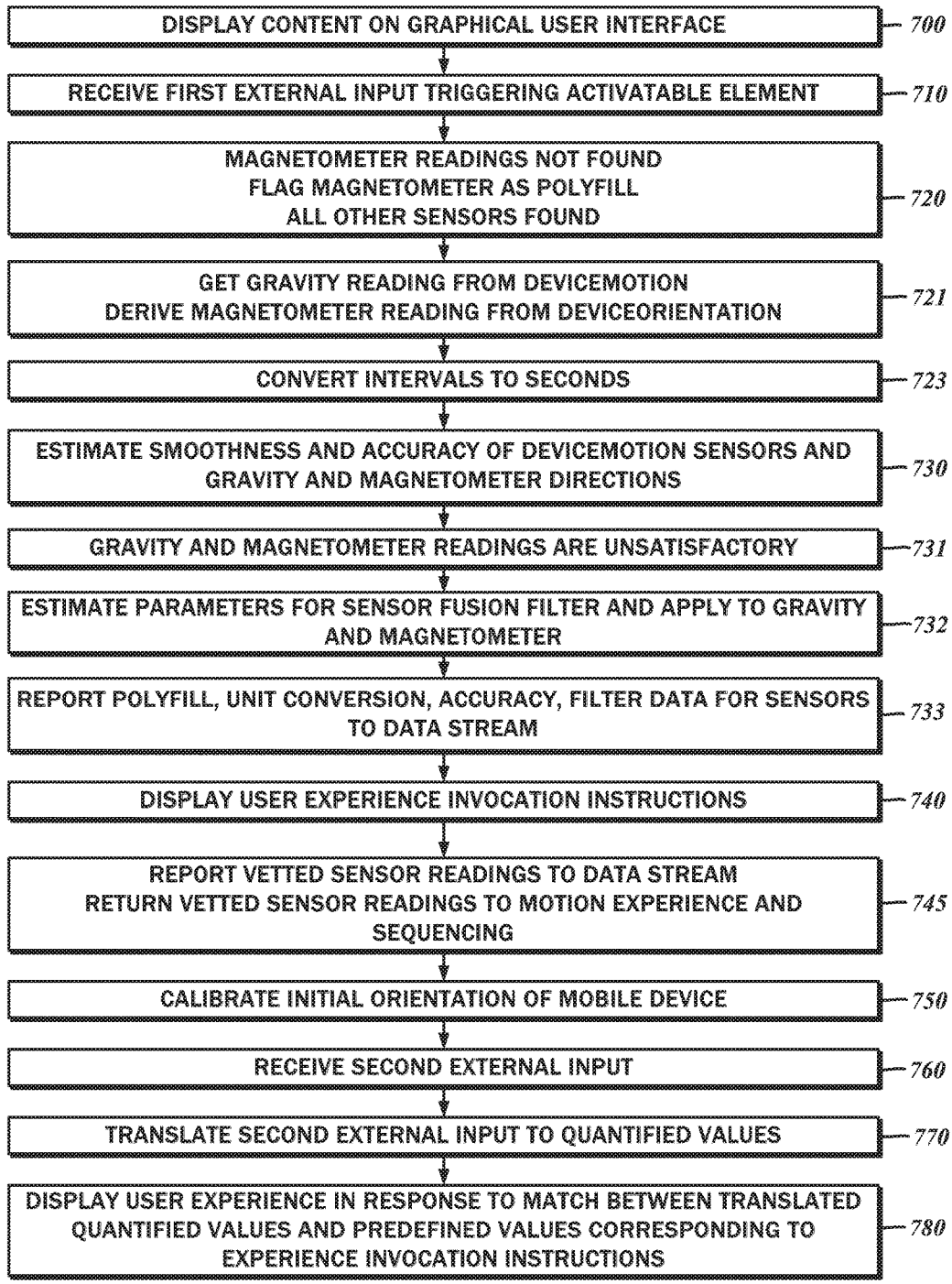
FIG. 7 is a flowchart of the sequence of operations performed by a second web browser application running on a second mobile platform in cooperation with the sensor control system to synthesize reported orientation data and reported motion data.

FIG. 7 is directed to a method that is specific to a second device and web browser combination, which may be the Samsung SG V and the Chrome web browser. Again, as with the other embodiment specific to the Apple iPhone and Safari web browser combination, the interactive experience begins with a step 700 of displaying content on a graphical user interface rendered on the display 20 of the mobile communications device 10. Thereafter, in accordance with a step 710, a first external input that triggers such activatable user interface element is received.

In step 720, as particular to the device/browser combination, magnetometer readings are not found, and so the magnetometer is flagged for the polyfill function. However, all other sensors are be found. Thereafter, per step 621, the gravity readings are obtained from the DeviceMotion object 58, and the magnetometer reading is derived from the DeviceOrientation object 60. In a step 723, the interval between sensor readings is converted to seconds. The steps 720, 721, and 723 are understood to correspond to the more generally recited step 220 of detecting missing sensor values and imputing data.

In a step 730, the smoothness and accuracy of the sensor values reported through the DeviceMotion object 58, and the gravity and magnetometer directions as derived are evaluated. Unlike the aforementioned iPhone/Safari browser combination, the evaluation of the data reported from/derived by the Samsung SG V and Chrome browser combination is oftentimes unsatisfactory with respect to the gravity and magnetometer readings per step 731, and therefore in a step 732, the parameters for the sensor fusion filter are estimated and then applied to the gravity and magnetometer values. The steps 730, 731, and 732 therefore correspond to the more generally recited step 230 of evaluating sensor data for activating adaptive filters.

Again, the operating statistics may be reported to the remote database 82. In a step 733, the sensor data, the derived polyfill data, the accuracy data, and the filter parameter data are reported. Similarly, in a step 745, the vetted sensor readings are reported to the remote database 82.

The user interaction experience continues with a step 740 of displaying user experience invocation instructions, which corresponds to step 240. Along these lines, in a step 750 (similar to step 250), the initial orientation of the mobile communications device 10 is calibrated as described above. The external input in the form of motion applied to the mobile communications device 10 and sensed by the onboard sensors is received per step 760 (similar to step 260). Based upon the standardization and filtration factors determined at the outset of the interactivity sequence, e.g., steps 720, 721, and 723, and steps 730-732, the received sensor input is translated into quantified values according to step 770 (similar to step 270). The translated values are then processed and a response is generated in a step 780 (similar to step 280), where the user experience is generated when there is a match between the translated quantified values and predefined values that correspond to the experience invocation instructions.

Figure 8:
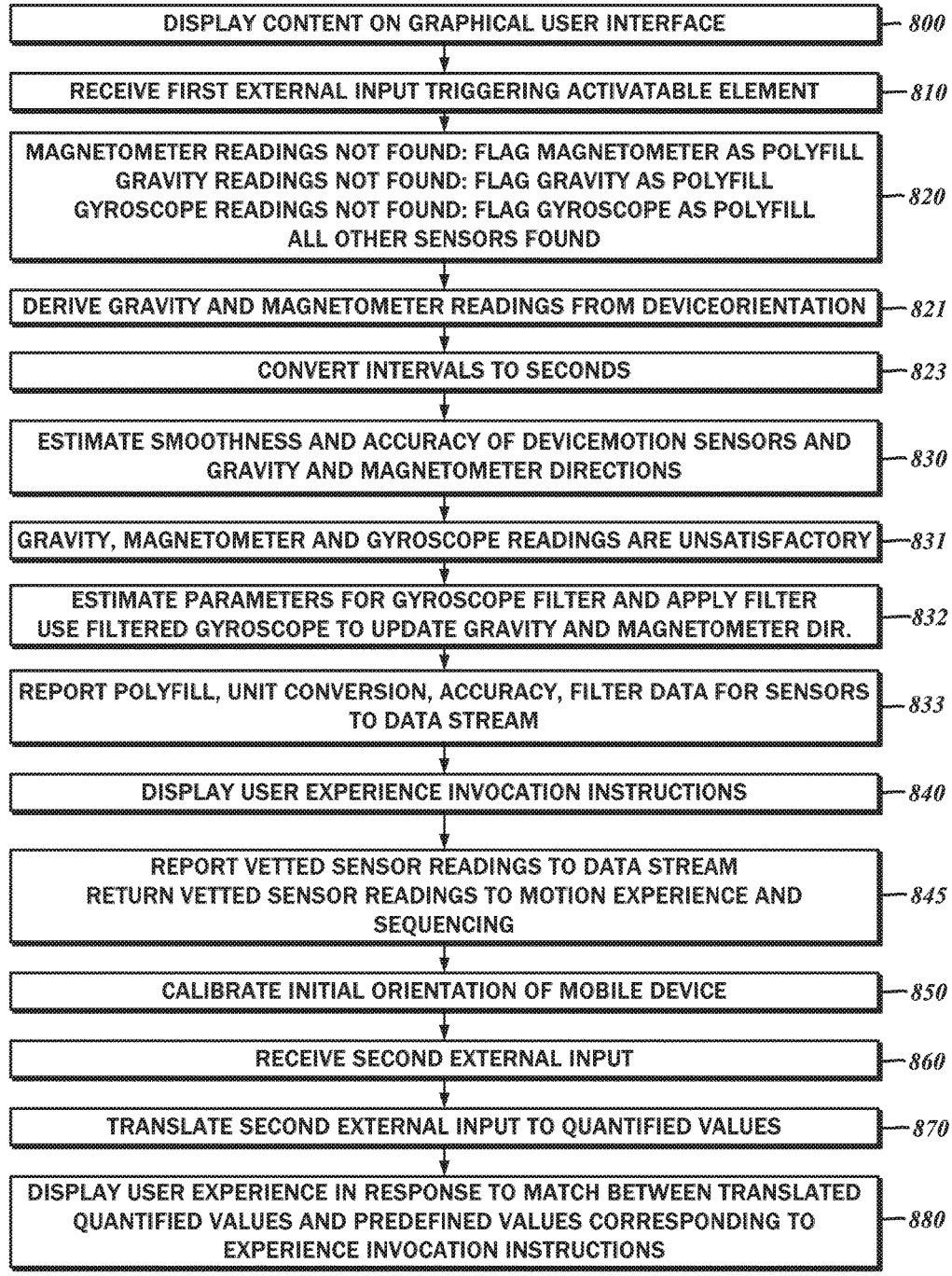
FIG. 8 is a flowchart of the sequence of operations performed by a third web browser application running on the second mobile platform in cooperation with the sensor control system to synthesize reported orientation data and reported motion data.

FIG. 8 is directed to a method that is specific to a third device and web browser combination, which may be the Samsung SG V and the stock system web browser. Again, as with the other embodiments particular to the foregoing device and web browser combinations, the interactive experience begins with a step 800 of displaying content on a graphical user interface rendered on the display 20 of the mobile communications device 10. Thereafter, in accordance with a step 810, a first external input that triggers such activatable user interface element is received.

In step 820, as particular to the device/browser combination, magnetometer readings are not found, gravity readings are not found, and gyroscope readings are not found, and so the magnetometer, gravity, and gyroscope are flagged for the polyfill function. However, all other sensors are found. Thereafter, per step 821, the gravity and the magnetometer readings are derived from the DeviceOrientation object 60. In a step 823, the interval between sensor readings is converted to seconds. The steps 820, 821, and 823 are understood to correspond to the more generally recited step 220 of detecting missing sensor values and imputing data.

In a step 830, the smoothness and accuracy of the sensor values reported through the DeviceMotion object 58, and the gravity and magnetometer directions as derived are evaluated. The evaluation of the data reported from/derived by the Samsung SG V and stock system browser combination is oftentimes unsatisfactory with respect to the gravity, magnetometer, and gyroscope readings per step 831, and therefore in a step 832, the parameters for the gyroscope filter are estimated and then applied to the gravity and magnetometer values. The steps 830, 831, and 832 therefore correspond to the more generally recited step 230 of evaluating sensor data for activating adaptive filters.

Like the other embodiments, the operating statistics may be reported to the remote database 82. In a step 833, the sensor data, the derived polyfill data, the accuracy data, and the filter parameter data are reported. Similarly, in a step 845, the vetted sensor readings are reported to the remote database 82.

The user interaction experience continues with a step 840 of displaying user experience invocation instructions, which corresponds to step 240. Along these lines, in a step 850 (similar to step 250), the initial orientation of the mobile communications device 10 is calibrated. The external input in the form of motion applied to the mobile communications device 10 and sensed by the onboard sensors is received per step 860 (similar to step 260). Based upon the standardization and filtration factors determined at the outset of the interactivity sequence, e.g., steps 820, 821, and 823, and steps 830-832, the received sensor input is translated into quantified values according to step 870 (similar to step 270). The translated values are then processed and a response is generated in a step 880 (similar to step 280), where the user experience is generated when there is a match between the translated quantified values and predefined values that correspond to the experience invocation instructions.

The foregoing particulars regarding the contemplated methods as applied in different device/browser combinations are provided by way of example only and not of limitation. Other mobile communications devices 10 may have different on-board sensors, and other web browsers may implement sensor reporting differently. The methods of the present disclosure are envisioned to be applicable to any other mobile communications device 10 or web browser application, and so it will be appreciated that the presently contemplated sensor switch system 52, 53 can be readily adapted to such alternative configurations. Indeed, other embodiments outside of the context of the web browser application described above are also envisioned.

Figure 9:
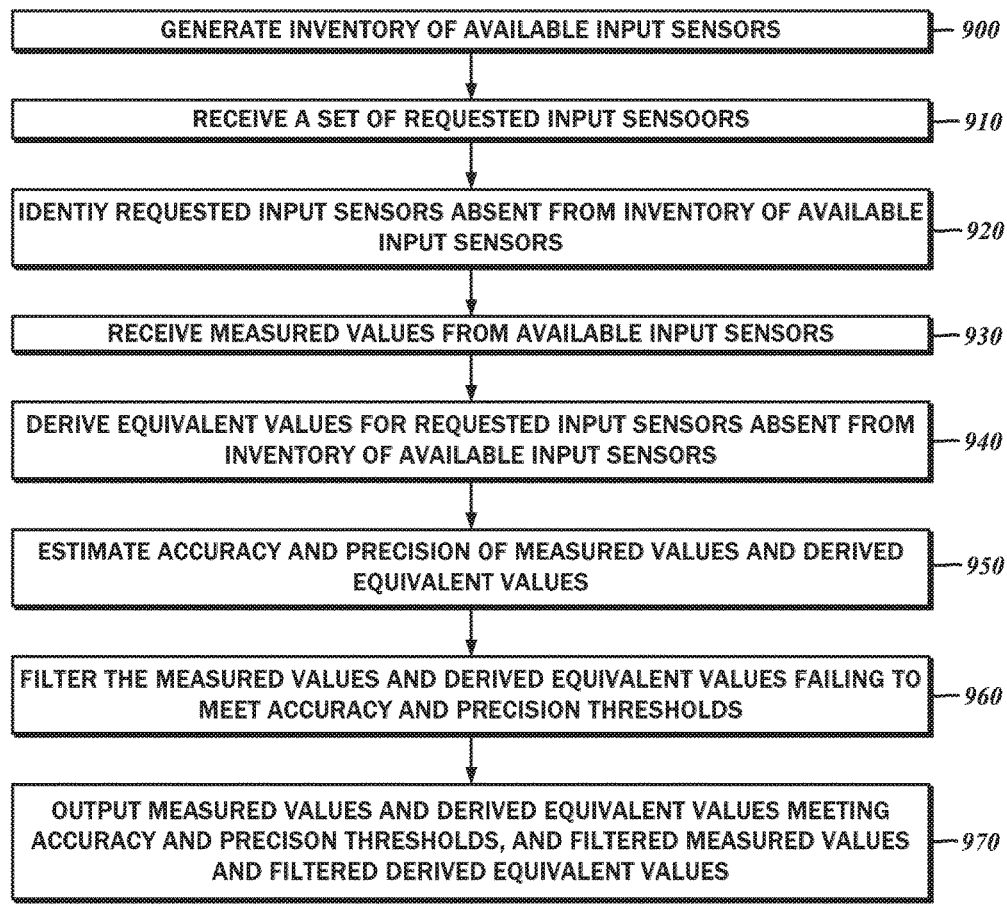
FIG. 9 is a flowchart of a sequence of steps in a method for governing sensor data readings from a plurality of input sensors.

A more generalized method for governing sensor data readings from a plurality of input sensors onboard the mobile communications device 10 will now be described with reference to the flowchart of FIG. 9. The method begins with a step 900 of generating an inventory of available input sensors integrated with the communications device. There is also a step 910 of receiving a set of requested input sensors from an application being executed on the mobile communications device 10. These two step are similar to, though not subject to any of the particulars described above in connection with steps 501 and 502 of the method illustrated in the flowchart of FIG. 5.

The method continues with a step 920 of identifying the requested input sensors that are absent from the inventory of available input sensors. A similar step or procedure 403 in which specific ones of the set of requested input sensors absent from the identified available input sensors has been described, it is expressly contemplated that the step 920 is not limited to an identification made through standard web browser objects.

Then, in a step 930, measured values from the available input sensors are received. Although a related step 510 likewise involves receiving measured values from sensors, again, the step 930 is not intended to be particular to any data passing modality as described above. Equivalent values for those sensors that are absent from the inventory of available input sensors are derived in accordance with a step 940. The equivalent values are understood to be derived from the received measured values from the available input sensors. The accuracy and precision of the measured values and the derived equivalent values are evaluated in a step 950. Any measurements that do not meet the set thresholds for accuracy and precision are filtered per step 960. Then, in a step 970, the measured values and the derived equivalent values, including those that originally met the thresholds for accuracy and precision, as well as those that did not meet the thresholds but were subsequently filtered in accordance with the step 960, are output to the application. Again, these steps may find correspondence to certain procedures outlined above in relation to the other embodiments, but are not to be limited thereto.

The particulars shown herein are by way of example and for purposes of illustrative discussion of the embodiments of the present disclosure only and are presented in the cause of providing what is believed to be the most useful and readily understood description of the principles and conceptual aspects. In this regard, no attempt is made to show details of the present invention with more particularity than is necessary, the description taken with the drawings making apparent to those skilled in the art how the several forms of the present invention may be embodied in practice.

What is claimed is:

1. A method for synthesizing reported orientation data and reported motion data from a web browser application being executed on a mobile communications device for passing to a web browser sub-application, the method comprising:
   identifying available input sensors from the reported orientation data and the reported motion data;
   receiving from the web browser sub-application a set of requested input sensors;
   flagging specific ones of the set of requested input sensors absent from the identified available input sensors;
   receiving measured values from the available input sensors;
   deriving equivalent values for the flagged specific ones of the requested input sensors from one or more measured values received from the available input sensors;
   normalizing each of the measured values and the derived equivalent values to respective standard units;
   applying a quality evaluation to each of the measured values and the derived equivalent values, the measured values and the derived equivalent values which satisfy a standard as defined under the quality evaluation being designated as adequate sensor values, while the measured values and the derived equivalent values not satisfying the standard as defined under the quality evaluation being designated as inadequate sensor values;
   selectively applying a processing operation to the inadequate sensor values; and
   passing the adequate sensor values and the processed inadequate sensor values to the web browser sub-application as a set of vetted sensor values.

2. The method of claim 1, wherein the processing operation includes:
   selecting a filtering strategy from one or more predetermined filtering strategies based upon the identified available input sensors;
   estimating one or more filtering parameters from an evaluation of the measured values received from the available input sensors; and
   applying the selected filtering strategy with the estimated one or more filtering parameters to the inadequate sensor values.

3. The method of claim 1, wherein the standard is static and preset.

4. The method of claim 1, wherein the standard is dynamically defined in response to variations in the measured values and the derived equivalent values.

5. The method of claim 1, further comprising:
generating an estimate of a gravitational force vector and a magnetometer direction vector from the received measured values and the derived equivalent values.

6. The method of claim 1, wherein the measured values from the available input sensors are received via the reported orientation data and the reported motion data from the web browser application.

7. The method of claim 1, wherein the reported orientation data is provided as a set of representations selected from a group consisting of: Euler angles, quaternion representations, and rotation matrix representations.

8. The method of claim 1, wherein the reported motion data is provided as a set of accelerometer sensor readings over a predefined time interval.

9. The method of claim 8, wherein the set of accelerometer sensor readings over the predefined interval are normalized to meters per second squared.

10. The method of claim 1, wherein the reported motion data is provided as a set of gyroscope readings over a predefined interval.

11. The method of claim 10, wherein the set of gyroscope readings over the predefined interval are normalized to radians per second.

12. The method of claim 1, wherein the reported motion data is provided as a set of gravity-corrected gyroscope readings over a predefined interval.

13. The method of claim 1, further comprising:
transmitting to a remote database an identifier of the mobile communications device and one or more sets of operating statistics data correlated thereto.

14. The method of claim 13, wherein the operating statistics data is selected from a group consisting of: a listing of available input sensors of the mobile communications device, a listing of specific ones of the set of requested input sensors absent from the identified available input sensors, one or more results from the quality evaluations of the measured values and the derived equivalent values, and a listing of processing operations applied to the inadequate sensor values.

15. The method of claim 13, wherein the operating statistics data is an initial orientation of the mobile communications device.

16. The method of claim 13, wherein the operating statistics data is an average rotation speed measured over a predetermined duration.

17. The method of claim 13, wherein the operating statistics data is an user engagement duration.

18. The method of claim 1, wherein the standard is accuracy.

19. The method of claim 1, wherein the standard is precision.

20. The method of claim 1, wherein the reported orientation data and the reported motion data is provided in one or more data feeds invoked from a web browser application programming interface object.

* * * * *